United States Patent [19]

Foster

[11] Patent Number: 5,445,260

[45] Date of Patent: Aug. 29, 1995

[54] EDGE SEAL FOR RECIPROCATING CONVEYOR

[76] Inventor: Raymond K. Foster, P.O. Box 1, Madras, Oreg. 97741

[21] Appl. No.: 306,125

[22] Filed: Sep. 14, 1994

[51] Int. Cl.$^6$ ............................................ B65G 25/04
[52] U.S. Cl. .................................................. 198/750
[58] Field of Search ..................... 198/496, 836.1, 750

[56] References Cited

U.S. PATENT DOCUMENTS

| | | | |
|---|---|---|---|
| 3,498,482 | 3/1970 | Lewis | 198/750 X |
| 3,534,875 | 10/1970 | Hallstrom, Jr. | 198/750 X |
| 4,140,217 | 2/1979 | Dell | 198/836.1 |
| 4,518,303 | 5/1985 | Moser | 198/750 X |
| 4,874,082 | 10/1989 | Swinderman | 198/836.1 |
| 4,896,761 | 1/1990 | Foster | 198/750 |
| 4,989,727 | 2/1991 | Gordon | 198/836.1 |
| 5,096,356 | 3/1992 | Foster | 198/750 X |
| 5,125,502 | 6/1992 | Foster | 198/750 |
| 5,165,524 | 11/1992 | Foster | 198/750 |
| 5,222,590 | 6/1993 | Quaeck | 198/750 X |

FOREIGN PATENT DOCUMENTS

| | | | |
|---|---|---|---|
| 1558069 | 2/1969 | France | 198/496 |
| 523246 | 4/1955 | Italy | 198/496 |

OTHER PUBLICATIONS

Two-page product sheet from American Brush Co., Portland, Oregon (No Date).

*Primary Examiner*—D. Glenn Dayoan
*Attorney, Agent, or Firm*—Joan H. Pauly

[57] ABSTRACT

A front shield extends across an end portion of a reciprocating floor conveyor above the conveyor slats. Each slat has a front end that rebiprocates longitudinally between first and second positions as the slat reciprocates. A multiplicity of bristles are carried by the shield and depend downwardly therefrom. The lower ends of the bristles contact a top surface of the slats rearwardly of the first and second positions. The bristles are bent by contact with the top surface to preload them into contact and maintain them in contact as the slats reciprocate. This prevents particles of material and debris from passing under the shield. The bristles are mounted on the shield via a carrier that is vertically adjustable relative to the shield to permit adjustment of the preload. The bristles are provided in a plurality of rows positioned one behind another in a longitudinal direction, with each row extending across the conveyor substantially continuously across each slat. The bristles have a sufficiently narrow cross section and are sufficiently close to each other to provide a substantially constant seal across contoured slats.

10 Claims, 3 Drawing Sheets

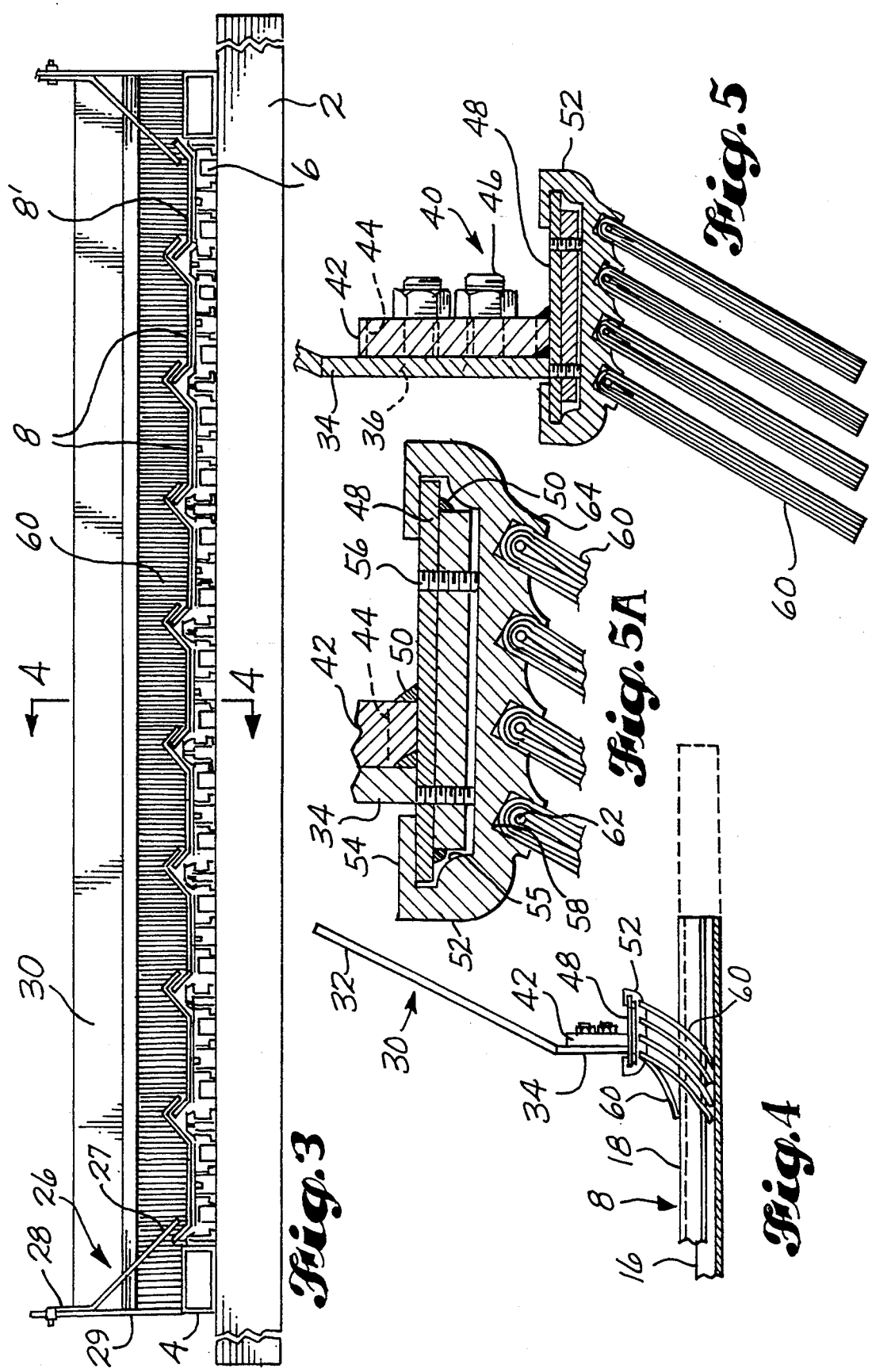

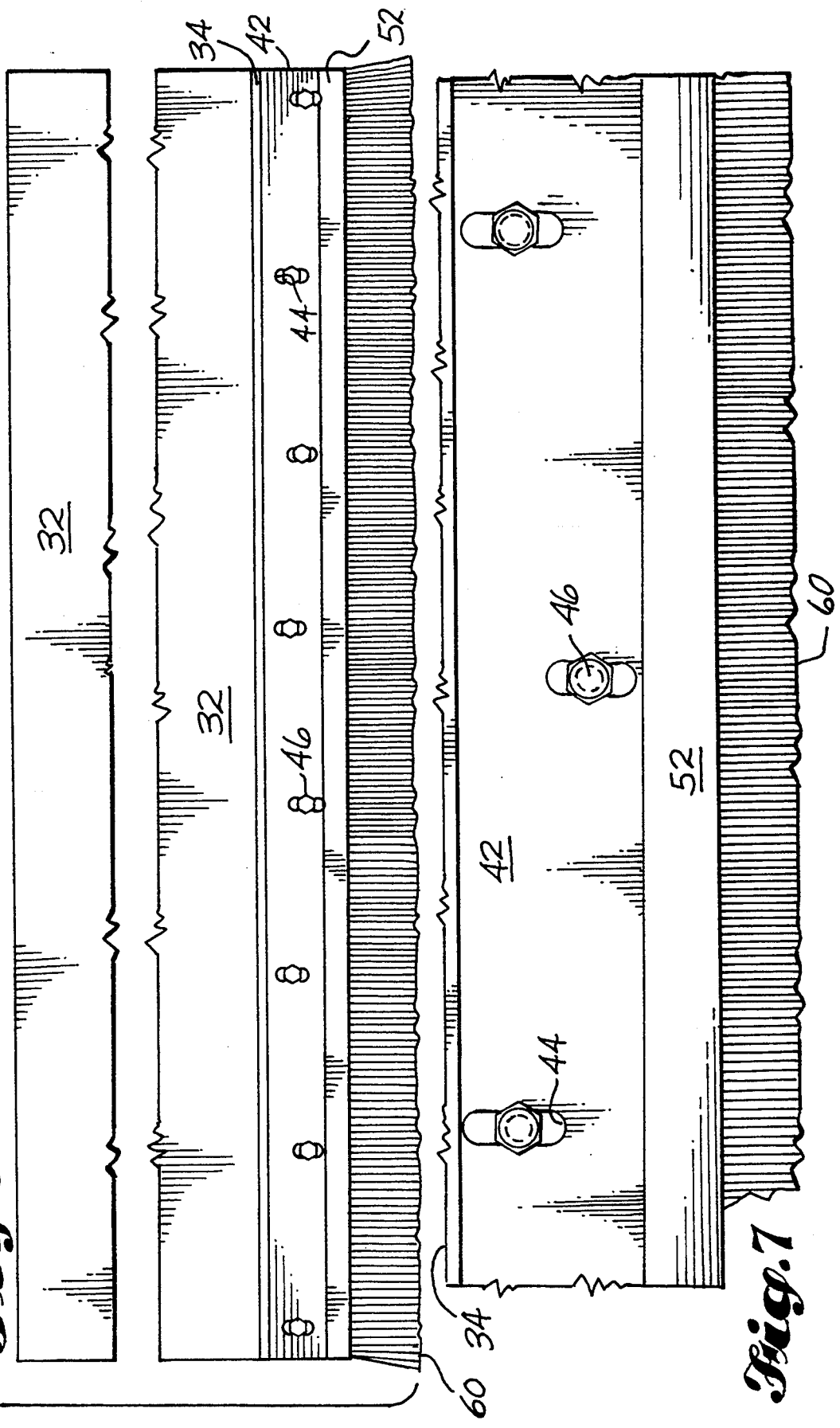

5,445,260

EDGE SEAL FOR RECIPROCATING CONVEYOR

TECHNICAL FIELD

This invention relates to edge seals for reciprocating conveyors and, more particularly, to such a seal comprising a multiplicity of bristles carried by a front shield extending across end portions of conveyor slats and preloaded into contact with the slats.

BACKGROUND INFORMATION

The invention is intended for use in a reciprocating floor conveyor of a known type having a plurality of side-by-side slats that reciprocate longitudinally of the conveyor. The slats are moved simultaneously in a conveying direction to convey a load and are moved back in the opposite direction sequentially. U.S. Pat. No. 5,165,524, granted Nov. 24, 1992, to the present applicant, discloses one example of such a conveyor and gives a more detailed description of the operation of the conveyor. The conveyor described in the patent and other conveyors of the same general type may be installed in the trailers of truck/trailer combinations or in or on other structures. The conveyors may be used for moving a wide variety of kinds of loads from relatively large discrete objects to particulate material. When particulate material is being conveyed or the load contains or is accompanied by such material, it is desirable to exclude the particles of material from the structure under the reciprocating slats of the conveyor. Excluding the material from the underlying area protects the bearing surfaces of the floor slats and any control and/or drive mechanisms that are located under the floor slats. This protection is important in order to reduce the maintenance requirements of the conveyor and maintain its durability and reliability.

SUMMARY OF THE INVENTION

The subject of the invention is an edge seal in a reciprocating floor conveyor having a plurality of side-by-side slats that reciprocate longitudinally of the conveyor. According to a basic aspect of the invention, the seal comprises a front shield and a multiplicity of bristles carried by the shield. Each slat has a front end that reciprocates longitudinally between first and second positions as the slat reciprocates. The shield extends across an end portion of the conveyor above the slats. The bristles depend downwardly from the shield and have lower ends that contact a top surface of the slats rearwardly of the first and second positions. The bristles are bent by contact with the top surface to preload them into such contact and maintain them in such contact as the slats reciprocate. This prevents particles of material and debris from passing under the shield.

The bristles may be provided in various configurations. A preferred feature of the bristle arrangement is a plurality of rows of bristles positioned one behind another in a longitudinal direction. Each row extends across the conveyor at least substantially continuously across each slat. Another preferred feature is bristles that have a sufficiently narrow cross section and are sufficiently close to each other to provide a substantially constant seal across contoured slats. The bristles may be made from various materials. In a preferred embodiment, the bristles are made from a plastic material.

Preferably, the preload of the bristles against the slats is adjustable. In the preferred embodiment, the edge seal comprises a carrier to which the bristles are attached. The carrier is adjustably mounted on the shield to permit it to be adjusted vertically relative to the shield. This, in turn, permits adjustment of the preload. Such adjustment may be desirable when, for example, wearing of the ends of the bristles or parts of the conveyor causes variation of the preload from an initial setting. It may also be used if different preloads are desired when different types of loads are being conveyed by the conveyor.

The present invention helps to achieve the goal of excluding particles of material from the structure underlying the floor slats by preventing such particles from falling down from the front end portions of the slats. This is accomplished by means of a relatively simple but effective structure that is very versatile and can easily be mounted on existing conveyors or included in the design of new conveyors. Preferably, the seal of the invention is used in combination with a side seal extending longitudinally along outer edge portions of opposite laterally outer slats. A rear seal may also be included.

The advantages and features discussed above and other advantages and features will become apparent from the detailed description of the best mode for carrying out the invention that follows.

BRIEF DESCRIPTION OF THE DRAWINGS

In the drawings, like element designations refer to like parts throughout, and:

FIG. 3 is an end view of a conveyor in which the slats and edge seal shown in FIGS. 1 and 2 are incorporated, looking at the rear end toward the forward end.

FIG. 4 is a sectional view taken along the line 4—4 in FIG. 3 and showing a first position of the front end of the floor slat in solid lines and a second position in broken lines.

FIG. 5 is a vertical sectional view of the shield, carrier, and bristle combination shown in FIGS. 1, 3, and 4.

FIG. 5A is an enlarged sectional view of a portion of FIG. 5 showing the attachment of the bristles to the carrier.

FIG. 6 is an elevational view of the apparatus shown in FIG. 5.

FIG. 7 is an enlarged elevational view of a portion of FIG. 6 illustrating the adjustment slots in the carrier.

BEST MODE FOR CARRYING OUT THE INVENTION

Figure 1:
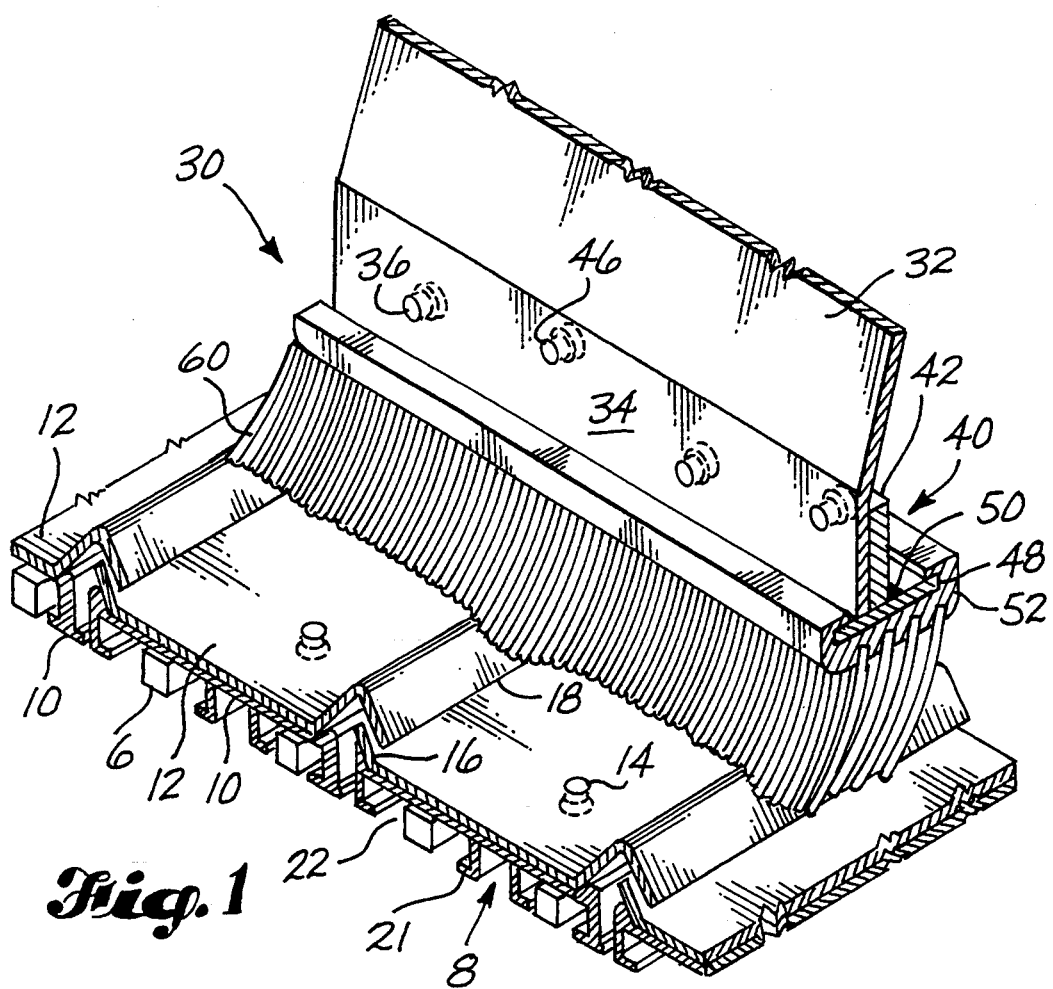
FIG. 1 is a pictorial view of the preferred embodiment of the invention and front portions of four floor slats.

The drawings show an edge seal that is constructed according to the invention and that also constitutes the best mode for carrying out the invention currently known to the applicant. In FIGS. 1-4, the seal is shown installed in a reciprocating floor conveyor designed for conveying particulate material. The edge seal of the invention is particularly advantageous for use in such a conveyor. However, it is intended to be understood that the seal may also be used in various other types of conveyors.

Referring to FIG. 3, the conveyor is mounted on a frame that includes an end beam 2. The beam 2 may, for example, be a lateral beam in the main frame structure of a container or the trailer of a truck/trailer combination. Normally, there would be two end beams 2 at opposite ends of the trailer or other structure in which the conveyor is installed. On each side of the conveyor, a side beam 4 extends along the laterally outer edge of the conveyor between the end beams 2. A plurality of laterally spaced apart guide beams 6 are positioned between and extend parallel to the side beams 4. The beams 2, 4, 6 are welded or otherwise secured together to provide a fixed support structure for the floor slats 8.

Figure 2:
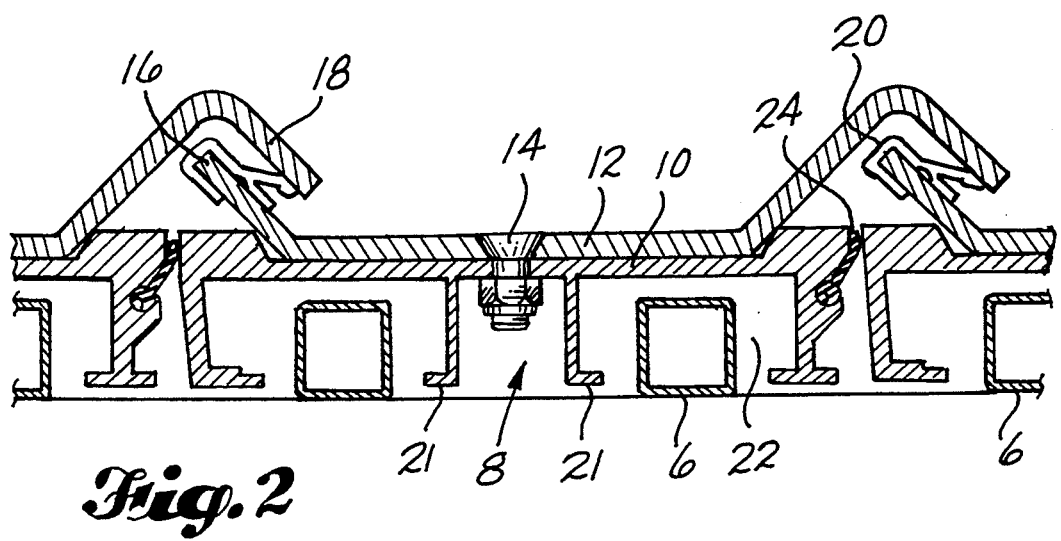
FIG. 2 is a cross-sectional view of one of the floor slats shown in FIG. 1 and fragmentary portions of the two adjacent slats.

The structure of the floor slats 8 is shown in FIGS. 1–4. Each slat 8 has a base portion 10 with a top and opposite sides that define a downwardly facing channel for receiving a pair of guide beams 6. The slat 8 also includes an upper portion 12 that is secured to the top of the base portion 10 by fasteners 14. A flange 16, 18 extends upwardly and laterally outwardly from each side of the upper portion 12. The flange 16 has a single leg that extends from the horizontal middle of the upper portion 12 at an angle of about 45°. The opposite flange 18 has a first leg that extends from the horizontal at an angle of about 45°. A second leg extends downwardly and laterally outwardly from the first leg at an angle of about 90° to the first leg. The second leg is shorter than the first leg, as can be seen in FIG. 2. A seal 20 is carried by the flange 16 of each floor slat 8 to sealingly engage the second leg of the flange 18 of the adjacent slat 8.

Two L-shaped members 21 depend downwardly from the lower surface of the base portion 10 of the slat 8 to form two spaces 22 for receiving the two guide beams 6 and bearings (not shown) for slidably supporting the slat 8 on the guide beams 6. The bearings may take any of a variety of known forms. One side of the base portion 10 carries a side seal 24 which slidably engages the side of the base portion 10 of the adjacent slat 8. The two seals 20, 24 both serve to prevent particulate matter from moving downwardly between the floor slats 8. The seal 24 may take various forms but is preferably generally of the type disclosed in my U.S. Pat. No. 4,896,761, granted Jan. 30, 1990.

Referring to FIGS. 3 and 4, the edge seal of the invention comprises a front shield 30 that includes an upper angled portion 32 and a lower vertical portion 34. The angled portion 32 extends forwardly and upwardly from the upper end of the vertical portion 34 at an angle of about 25°. The vertical portion 34 has a plurality of fastener holes 36 arranged in a two-row staggered pattern, best seen in FIGS. 1, 6, and 7. The shield 30 extends laterally across a forward end portion of the structure in which the conveyor is installed. For example, in a trailer of a truck/trailer combination, the shield 30 would be positioned in the forward end of the trailer adjacent to the truck cab.

As used herein, the terms "front" and "forward" and the like are used in reference to a trailer or container for the purposes of illustration. Their use is not intended to limit the type of structure into which the floor conveyor and the edge seal of the invention may be incorporated or to restrict the edge seal to a forward installation. The edge seal could also be mounted in a rear, intermediate, or lateral location without departing from the spirit and scope of the invention, as set forth in the claims.

Referring to FIG. 3, the sealing arrangement of the conveyor preferably also includes opposite side shields 26. Each side shield 26 includes a lower angled portion 27 that extends downwardly and laterally inwardly at an angle of about 45°, and an upper vertical portion 28.

The upper vertical portion 28 is secured to a vertical support plate 29 by a suitable fastener. The support plate 29 extends upwardly from the laterally outer end of the corresponding side beam 4.

The laterally outermost slat 8 adjacent to the side shield 26 has a single-leg flange 16 that extends upwardly and laterally outwardly adjacent to the lower end of the lower portion 27 of the side shield 26 to permit a sealing engagement between the laterally outer slat 8 and the shield 26. Preferably, the flange 16 is provided with a seal 20 that sealingly engages the side shield 26 in the same manner that the flanges 16, 18 of adjacent floor slats engage each other, as shown in FIG. 2 and described above. To enable the sealing engagement, the floor slat 8' on the right side of the conveyor (as shown in FIG. 3) has a modified configuration with two single-leg flanges 16, rather than the flange 16 - flange 18 configuration of the other slats 8.

The front end of each floor slat 8, 8' has a first position and a second position between which it longitudinally reciprocates when the conveyor is operated to reciprocate the slats 8, 8'. The first and second positions are shown in solid lines and dotted lines, respectively, in FIG. 4. The front shield 30 extends across an end portion of the conveyor above the slats 8, 8'. A multiplicity of bristles 60 depend downwardly from the shield 30. The bristles 60 are positioned so that their lower ends contact the top surface of the slats 8, 8' rearwardly of both the first position and the second position of the front ends of the slats 8, 8'. As shown in FIGS. 1 and 4, the bristles 60 are bent by contact with the top surface of the slats 8, 8' to preload them into such contact. The preloading of the bristles 60 and their positioning rearwardly of the front ends of the slats 8, 8' throughout the reciprocating cycle of the slats 8, 8' maintains the lower ends of the bristles 60 in contact with the slats 8, 8' as the slats 8, 8' reciprocate. This prevents particles of material and debris from passing under the shield 30.

Referring to FIGS. 1, 4, 5, and 5A, the bristles 60 are preferably mounted on the shield 30 by means of a carrier 40. The carrier 40 has an upper vertical portion 42 that is provided with slots 44 (FIGS. 5–7). Fasteners 46 extend through each of the slots 44 and a corresponding aligned fastener hole 36 in the shield 30 to secure the carrier 40 to the shield 30. The slot configuration of the fastener holes 44 in the carrier 40 allows the carrier 40 to be adjusted vertically relative to the shield 30. This, in turn, permits adjustment of the preload of the bristles 60 against the slats 8. Such adjustment might be desired, for example, for the reasons discussed above.

The lower end of the vertical portion 42 of the carrier 40 is secured to a plate 48 having a T-shaped cross section, best seen in FIGS. 5 and 5A. As shown therein, the vertical portion 42 is secured to the plate 48 by means of welds 50. The plate 48 itself may be formed from two separate pieces that are also secured together by means of welds 50. Together, the vertical portion 42 and plate 48 form an integrated member.

The carrier 40 also includes a holder 52 having opposite inwardly extending top flanges 54 that define a channel 55 that receives the T-shaped plate 48. Set screws 56 extend through the plate 48 and engage the inner upwardly facing horizontal surface of the channel 55 to wedge the upper surface of the plate 48 against the downwardly facing inner faces of the flanges 54. This secures the plate 48 in position in the channel 55. In order to remove the holder 52 for maintenance or replacement, all that is necessary is to loosen the set screws 56 and slide the holder 52 off of the plate 48. In the preferred embodiment, the T-shaped plate 48 is steel, and the holder 52 is an aluminum extrusion.

The lower portion of the holder 52 below the channel 55 has a plurality of smaller channels 58 extending into its lower surface and laterally across the holder 52. Each channel 48 receives a row of bristles 60. The rows of bristles 60 are positioned one behind another in a longitudinal direction. Each row of bristles 60 extends across the conveyor at least substantially continuously across each slat 8. In addition, each bristle 60 has a sufficiently narrow cross section, and the bristles 60 are sufficiently close to each other, to provide a substantially constant seal across contoured slats, such as the slat's 8, 8' shown in FIGS. 1-4. The bristle cross section preferably has a diameter of one sixteenth of an inch or smaller. An example of a suitable bristle cross section is a circular cross section with a diameter of about 0.036 inch. A preferred bristle material is white Nylon or a similar plastic.

The bristles 60 may be attached to the carrier 40 by various means. Preferably, each row of bristles 60 is folded in half around a continuous wire 62 extending across the holder 52. Adjacent to each channel 58 is a finger projection 64 which is crimped after the bristles 60 are positioned in the channel 58 to securely retain the bristles 60 in the channel 58.

A number of the features of the edge seal of the invention cooperate to provide effective sealing of the ends of the slats 8, 8' and prevent particles of material and debris from passing under the front shield 30. These features include the preloading of the bristles 60 against the tops of the slats 8, 8', the positioning of the bristles so that they are always rearward of the front ends of the slats 8, 8', the arrangement of the bristles 60 in a plurality of rows, and the narrow cross section of the bristles 60 and their closely adjacent relationship to each other. The plurality of rows of bristles 60 and the multiplicity of bristles 60 in each row create a complicated flow path so that even very small particles are at least substantially prevented from passing under the front shield 30. The preloaded flexible bristles 60 remain in contact with the tops of the slats 8, 8' even if the slats 8, 8' move side to side or up and down or the tops become worn from use. During the operation of the conveyor, the bristles 60 remain in the rearwardly bent configuration shown in FIG. 4 to help maintain the effectiveness of the edge seal. When it is desired to maximize the effectiveness in a new or existing installation, the feature of vertical adjustability of the carrier 40 may be used to adjust the preload. Although the preferred embodiment of the invention has been illustrated and described herein, it is intended to be understood by those skilled in the art that various modifications and omissions in form and detail may be made without departing from the spirit and scope of the invention as defined by the following claims.

What is claimed:

1. In a reciprocating floor conveyor having a plurality of side-by-side slats that reciprocate longitudinally of the conveyor, an edge seal comprising:

each said slat having a front end that reciprocates longitudinally between first and second positions as said slat reciprocates;

a front shield extending across an end portion of the conveyor above said slats;

a multiplicity of bristles carried by said shield and depending downwardly therefrom, said bristles having lower ends that contact a top surface of said slats rearwardly of said first and second positions, and said bristles being bent by contact with said top surface to preload them into such contact and maintain them in such contact as the slats reciprocate, to prevent particles of material and debris from passing under said shield.

2. The edge seal of claim 1, comprising a plurality of rows of said bristles positioned one behind another in a longitudinal direction, each said row extending across the conveyor at least substantially continuously across each said slat.

3. The edge seal of claim 2, comprising a carrier to which said bristles are attached, and first and second mounting portions that are carried by said carrier and said shield, respectively, and that engage each other; said first and second mounting portions being movable with respect to each other to adjustably mount said carrier on said shield to permit said carrier to be adjusted vertically relative to said shield to, in turn, adjust the preload of said bristles against said slats.

4. The edge seal of claim 1, comprising a carrier to which said bristles are attached, and first and second mounting portions that are carried by said carrier and said shield, respectively, and that engage each other; said first and second mounting portions being movable with respect to each other to adjustably mount said carrier on said shield to permit said carrier to be adjusted vertically relative to said shield to, in turn, adjust the preload of said bristles against said slats.

5. The edge seal of claim 4, in which each said bristle has a sufficiently narrow cross section and said bristles are sufficiently close to each other to provide a substantially constant seal across contoured slats.

6. The edge seal of claim 5, comprising a plurality of rows of said bristles positioned one behind another in a longitudinal direction, each said row extending across the conveyor at least substantially continuously across each said slat.

7. The edge seal of claim 1, in which each said bristle has a sufficiently narrow cross section and said bristles are sufficiently close to each other to provide a substantially constant seal across contoured slats.

8. The edge seal of claim 7, comprising a plurality of rows of said bristles positioned one behind another in a longitudinal direction, each said row extending across the conveyor at least substantially continuously across each said slat.

9. The edge seal of claim 1, further comprising side seals extending longitudinally along outer edge portions of opposite laterally outer slats.

10. The edge seal of claim 1, in which said bristles are made from a plastic material.

* * * * *